(12) United States Patent
Henne et al.

(10) Patent No.: US 6,698,684 B1
(45) Date of Patent: Mar. 2, 2004

(54) SUPERSONIC AIRCRAFT WITH SPIKE FOR CONTROLLING AND REDUCING SONIC BOOM

(75) Inventors: Preston A. Henne, Hilton Head IS., SC (US); Donald C. Howe, Savannah, GA (US); Robert R. Wolz, Savannah, GA (US); Jimmy L. Hancock, Jr., Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 0 days.

(21) Appl. No.: 10/104,403

(22) Filed: Mar. 22, 2002

Related U.S. Application Data

(63) Continuation-in-part of application No. 10/060,656, filed on Jan. 30, 2002.

(51) Int. Cl.$^7$ ............................. B64C 30/00; B64C 7/00
(52) U.S. Cl. ..................... 244/1 N; 244/119; 181/211
(58) Field of Search ................. 244/1 N, 119, 244/120, 130; 181/211

(56) References Cited

U.S. PATENT DOCUMENTS

| | | |
|---|---|---|
| 1,785,477 A | 12/1930 | Cooney |
| 1,805,994 A | 5/1931 | Niemeyer |
| 2,874,922 A | 2/1959 | Whitcomb |
| 2,916,230 A | 12/1959 | Nial |
| D191,019 S | 8/1961 | Thieblot |
| 2,995,320 A | 8/1961 | Gottschalk |
| D191,930 S | 12/1961 | Cella |
| 3,188,025 A | 6/1965 | Moorehead |
| D202,311 S | 9/1965 | Rellis |
| D206,299 S | 11/1966 | Rellis |
| 3,425,650 A * | 2/1969 | Silva .................... 244/130 |
| 3,447,761 A | 6/1969 | Whitener et al. |
| D215,894 S | 11/1969 | Rellis |
| 3,478,989 A | 11/1969 | Bielefeldt |
| 3,489,375 A | 1/1970 | Tracy |
| 3,490,556 A | 1/1970 | Bennett, Jr. et al. |
| 3,643,901 A | 2/1972 | Patapis |
| 3,647,160 A | 3/1972 | Alperin |
| 3,655,147 A | 4/1972 | Preuss |

(List continued on next page.)

OTHER PUBLICATIONS

NASA Conference Publication 3027, 1988 C. Darden, et al, *Status of Sonic Boom Methodology and Understanding*.

AIAA Report 91–3103, 1991, G. Haglund and Boeing Commercial Airplane Group, *HSCT Designs for Reduced Sonic Boom*.

AIAA–98–2956, 1998, R. Seebass and B. Argrow, *Sonic Boom Minimization Revistied*.

1952, G. Whitham, *The Flow Pattern of a Supersonic Projectile* (from Communications on Pure and Applied Math, vol. V, 301–348).

(List continued on next page.)

Primary Examiner—Robert P. Swiatek
(74) Attorney, Agent, or Firm—Howrey Simon Arnold & White LLP

(57) ABSTRACT

An aircraft includes a spike projecting forward from the leading end of the fuselage and/or rearward from the trailing end of the fuselage. The spike can include a single section or two or more sections of varying cross-sectional area. Transition regions between sections of varying cross-sectional area are located and shaped to reduce coalescence of shock waves created thereby during supersonic flight. The spike can be collapsible and can be retracted into the fuselage. The spike can have a cross-sectional shape wherein the nose thereof lies on a line formed by the intersection of the bottom of the spike with a plane tangent to the bottom of the spike. A spike thus shaped causes an asymmetric pressure distribution during supersonic flight, wherein the ground-directed pressure contour is of lesser magnitude than the pressure contour propagating in other directions.

39 Claims, 12 Drawing Sheets

U.S. PATENT DOCUMENTS

| | | |
|---|---|---|
| 3,709,446 A | 1/1973 | Espy |
| 3,737,119 A | 6/1973 | Cheng |
| 3,776,489 A | 12/1973 | Wen |
| 3,794,274 A * | 2/1974 | Eknes .................. 244/130 |
| 3,971,535 A | 7/1976 | Jones |
| 4,037,808 A | 7/1977 | Kaniut |
| 4,114,836 A | 9/1978 | Graham et al. |
| 4,172,574 A | 10/1979 | Spillman |
| 4,176,813 A | 12/1979 | Headley et al. |
| 4,189,939 A | 2/1980 | West et al. |
| 4,240,597 A | 12/1980 | Ellis et al. |
| 4,272,043 A | 6/1981 | Spillman |
| 4,311,289 A | 1/1982 | Finch |
| 4,318,328 A | 3/1982 | Rona |
| 4,327,581 A | 5/1982 | Jackson, Jr. et al. |
| 4,378,922 A | 4/1983 | Pierce |
| 4,390,150 A | 6/1983 | Whitener |
| 4,598,886 A | 7/1986 | Friebel et al. |
| 4,641,796 A | 2/1987 | Feifel |
| 4,650,139 A | 3/1987 | Taylor et al. |
| 4,691,879 A | 9/1987 | Greene |
| 4,691,881 A | 9/1987 | Gioia |
| 4,706,902 A | 11/1987 | Destuynder et al. |
| 4,718,620 A | 1/1988 | Braden et al. |
| 4,723,214 A | 2/1988 | Frei |
| 4,750,693 A | 6/1988 | Löbert et al. |
| 4,815,680 A | 3/1989 | Goldhammer |
| 4,907,765 A | 3/1990 | Hirschel et al. |
| 4,949,269 A | 8/1990 | Buisson et al. |
| 5,072,894 A | 12/1991 | Cichy |
| 5,114,099 A | 5/1992 | Gao |
| 5,115,999 A | 5/1992 | Buchsel et al. |
| 5,133,519 A | 7/1992 | Falco |
| 5,143,320 A | 9/1992 | Boyadjian |
| 5,251,846 A * | 10/1993 | Rethorst .................. 244/15 |
| 5,322,242 A | 6/1994 | Tracy |
| D349,271 S | 8/1994 | Inoue et al. |
| 5,341,677 A | 8/1994 | Maris |
| 5,358,156 A | 10/1994 | Rethorst |
| 5,526,999 A * | 6/1996 | Meston .................. 244/2 |
| 5,676,333 A | 10/1997 | Rethorst |
| 5,731,995 A | 3/1998 | Benne et al. |
| 5,738,156 A | 4/1998 | Stewart |
| 5,740,984 A * | 4/1998 | Morgenstern .............. 244/1 N |
| 5,794,887 A | 8/1998 | Komerath et al. |
| 5,796,612 A | 8/1998 | Palmer |
| 5,797,563 A | 8/1998 | Blackburn et al. |
| 5,842,666 A | 12/1998 | Gerhardt et al. |
| 5,875,998 A | 3/1999 | Gleine et al. |
| 5,897,076 A | 4/1999 | Tracy |
| 5,934,607 A | 8/1999 | Rising et al. |
| 5,947,422 A | 9/1999 | Wille |
| D417,184 S | 11/1999 | Hartmann et al. |
| 5,992,797 A | 11/1999 | Seidel et al. |
| D428,381 S | 7/2000 | Hartmann et al. |
| 6,098,923 A | 8/2000 | Peters, Jr. |
| 6,102,328 A | 8/2000 | Kumata et al. |
| D431,522 S | 10/2000 | Fujino |
| 6,149,101 A | 11/2000 | Tracy |
| 6,161,802 A | 12/2000 | Cunningham, Jr. |
| 6,216,063 B1 | 4/2001 | Lind et al. |
| 6,253,126 B1 | 6/2001 | Palmer |
| 6,283,407 B1 | 9/2001 | Hakenesch |
| 6,308,913 B1 | 10/2001 | Fujino et al. |
| 6,336,060 B1 | 1/2002 | Shigemi et al. |
| 6,341,247 B1 | 1/2002 | Hreha et al. |
| 6,424,923 B1 | 7/2002 | Huyer et al. |
| 2002/0088276 A1 | 7/2002 | Omotani et al. |

OTHER PUBLICATIONS

1955, G. Whitham, *On the Propagation of Weak Shock Waves.*

AIAA 68–159, 1968, A. George, *Reduction of Sonic Boom by Azimuthal Redistribution of Overpressure.*

NASA Technical Note D–1494, 1962, H. Carlson, *The Lower Bound of Attainable Sonic–Boom Overpressure and Design Methods of Approaching This Limit.*

NASA Technicla Report TR–213, 1964, H. Carlson, *Correlation of Sonic–Boom Theory With Wind–Tunnel and Flight Measurements.*

NASA Technical Note TN D–2877, F. McLean, *Some Non-asymptotic Effects on the Sonic Boom of Large Airplanes.*

NASA Technical Note TN D–5148, 1969, R. Barger, *Investigation of a Class of Bodies that Generate Far–Field Sonic–Boom Shock Strength and Impulse Independent of Body Length and Volume.*

NASA Technical Note TN D–7218, 1973, H. Carlson, *Application of Sonic–Boom Minimization Concepts in Supersonic Transport Design.*

NASA Technical Note TN D–7842, 1975, C. Darden, *Minimization of Sonic–Boom Parameters in Real and Isothermal Atmospheres.*

NASA Technical Paper 1348, 1979, C. Darden, *Sonic–Boom Minimization With Nose–Bluntness Relaxation.*

NASA Technical Paper 1421, 1979, R. Mack, *Wind–Tunnel Investigation of the Validity of a Sonic–Boom–Minimization Concept.*

NASA Technical Note TN D–7160, 1973, L. Hunton, *Some Effects of Wing Planform on Sonic Boom.*

NASA Technical Note TN D–6832, 1972, C. Thomas, *Extrapolation of Sonic Boom Pressure Signatures by the Waveform Parameter Method.*

Paper, K. Plotkin, Wyle Laboratories, *Sonic Boom Minimization: Myth of Reality.*

NASA SP–147, 1967, A.R. Seebass, *Sonic Boom Research.*

NASA SP 180, 1968, Edited by I. Schwartz, *Second Conference on Sonic Boom Research.*

NASA SP–255, 1971, Edited by I. Schwartz, *Third Conference on Sonic Boom Research.*

United States Co–Pending Application Ser. No. 10/060,656 filed Jan. 30, 2002 and entitled *Supersonic Aircraft With Spike For Controlling And Reducing Sonic Boom.*

\* cited by examiner

SUPERSONIC AIRCRAFT WITH SPIKE FOR CONTROLLING AND REDUCING SONIC BOOM

CROSS-REFERENCE TO RELATED APPLICATION

This application is a continuation-in-part of, and claims priority from, pending U.S. patent application Ser. No. 10/060,656 filed on Jan. 30, 2002.

BACKGROUND OF THE INVENTION

1. Field of the Invention

The invention relates generally to aircraft fuselage design. More particularly, it relates to aircraft fuselage configurations that control the build-up, magnitude, and directional characteristics of pressure waves generated by an aircraft flying at supersonic speed so as to reduce the sonic boom at ground level.

2. The Prior Art and Background

A conventional aircraft in flight produces pressure waves in the medium it flies through. These pressure waves propagate at the speed of sound. When the aircraft flies at subsonic speed, these pressure waves propagate in all directions around the aircraft, including ahead of the aircraft. When the aircraft flies at supersonic speed, these pressure waves cannot propagate ahead of the aircraft because the aircraft is traveling faster than the propagation speed of the waves. Instead, the pressure waves generated by such a conventional aircraft coalesce into two shock waves, one formed by the nose of the aircraft and the other formed by the tail of the aircraft. These shock waves are characterized by an abrupt pressure increase across the wave. With respect to the shock wave formed by the nose (the "bow shock"), the pressure increases abruptly from about ambient to above ambient. The pressure decreases from above ambient to below ambient in the region between the bow shock and the shock wave formed by the tail (the "tail shock"). The pressure then increases abruptly from below ambient to about ambient across the tail shock.

In the limit, weak shock waves propagate in the form of a Mach cone having a shape defined by the Mach angle $\mu$. The Mach angle $\mu$ is a function of the Mach number M, which is defined as the ratio of the speed of an object to the speed of sound. The Mach angle $\mu$ can be determined using the equation:

$$\sin(\mu) = \frac{1}{M}, \text{ or}$$
$$\mu = \sin^{-1}\left(\frac{1}{M}\right)$$

The shape of the Mach cone produced by an aircraft in supersonic flight can be represented by rotating a line drawn at an angle $\mu$ to the aircraft's direction of travel about a line representing the aircraft's direction of travel, so that the tip of the Mach cone points in the direction of travel.

These shock waves can propagate great distances away from the aircraft and eventually reach the ground, where they can produce significant acoustic disturbances called sonic booms. Sonic booms are so named because of the sounds created by the abrupt pressure changes when the shock waves pass a reference point on the ground. The acoustic signature of a sonic boom commonly is characterized as an N-wave because the pressure changes associated with the acoustic signature resemble the letter "N" when plotted as a function of aircraft length. That is, an N-wave is characterized by the abrupt pressure rise associated with the bow shock, commonly referred to as "peak overpressure," followed by a substantially linear decrease in pressure to below ambient pressure, followed by the abrupt rise to ambient pressure associated with the tail shock. Sonic booms can cause objectionable sounds and vibrations. For these reasons, supersonic flight over populated areas has long been limited by regulation.

In order for supersonic flight over land to be acceptable, the pressure disturbances that cause the sonic boom's acoustic signature must be controlled so that the effects of the abrupt pressure changes caused by the shock waves are minimized at ground level. Many attempts have been made to modify the design of supersonic aircraft in order to adjust the sonic boom signature. These modifications have included changes to wing design, as described in U.S. Pat. No. 5,934,607, issued to Rising, et al., for a "Shock Suppression Supersonic Aircraft." Another approach involves incorporating air passages through the fuselage or wings of supersonic aircraft, such as the structures described in U.S. Pat. No. 4,114,836, issued to Graham, et al., for an "Airplane Configuration Design for the Simultaneous Reduction of Drag and Sonic Boom"; U.S. Pat. No. 3,794,274, issued to Eknes, for an "Aircraft Structure to Reduce Sonic Boom Intensity"; and U.S. Pat. No. 3,776,489, issued to Wen, et al., for a "Sonic Boom Eliminator." Further attempts at reducing the sonic boom caused by supersonic aircraft include the addition to the aircraft of structure arranged to disrupt the air flow patterns as the aircraft travels at supersonic speed. Examples include the structure described in U.S. Pat. No. 3,709,446, issued to Espy, for a "Sonic Boom Reduction" and U.S. Pat. No. 3,647,160, issued to Alperin, for a "Method and Apparatus for Reducing Sonic Booms."

Another attempt to control the sonic boom in a supersonic aircraft uses a blunt nose to increase the air pressure immediately adjacent to the nose of the aircraft, thus disrupting the normal formation of the pressure wave that causes the acoustic signature. This disruption results in the reduction of abrupt pressure changes in the acoustic wave that strikes the ground. A blunt nose, however, creates a significant amount of drag on the aircraft, drastically decreasing its efficiency. U.S. Pat. No. 5,740,984, issued to Morgenstern, for a "Low Sonic Boom Shock Control/Alleviation Surfaces" describes a mechanical device on the nose of the airplane which can be moved between a first position effecting a blunt nose when sonic boom reduction is desired and a second position effecting a streamlined nose when sonic boom reduction is not required, thereby removing (in the streamlined configuration) the drag penalty inherent in a blunt nose design. U.S. Pat. No. 4,650,139, issued to Taylor et al., discloses a blunt-nosed spike which can be extended from a space vehicle's fuselage.

U.S. Pat. Nos. 5,358,156, 5,676,333, and 5,251,846, all issued to Rethorst and all entitled "Supersonic Aircraft Shock Wave Energy Recovery System" (collectively "the Rethorst patents"), describe a supersonic aircraft having a spike extending from the front of the aircraft and a forward ring on the fuselage for eliminating a sonic boom. The spike is said to direct the bow shock onto the manifold ring which recovers the shock energy and converts it to useful work. The spike is said to be extendable, but it does not include a complex surface contour, and it is not disclosed to include a number of telescopically collapsible sections. Instead, it is disclosed as a single cylindrical member which tapers to a point at its leading end.

U.S. Pat. No. 3,643,901, issued to Patapis, discloses a ducted spike for attachment to a blunt body operating at supersonic speed for the purpose of receiving and diffusing oncoming air to reduce pressure drag on and erosion of the blunt body.

U.S. Pat. No. 3,425,650, issued to Silva, discloses an apparatus which can be extended on a boom from the front of an aircraft to deflect air outwardly therefrom.

U.S. Pat. No. 3,655,147, issued to Preuss, covers a device attached to the lower forebody of an aircraft for the purpose of reflecting pressure disturbances caused by the aircraft's flight in directions away from the ground.

Although some of the foregoing references are directed to sonic boom mitigation, none of them address the sonic boom signature shaping techniques of the present invention.

SUMMARY OF THE INVENTION

The present invention provides an improvement in aircraft design which is directed to mitigating the effects of sonic booms at ground level. An aircraft according to the present invention includes a spike which extends from the aircraft's nose in a direction substantially parallel to the aircraft's length to effectively lengthen the aircraft. A longer aircraft generally is expected to produce a sonic boom of lesser amplitude at ground level than a shorter aircraft of similar weight because the pressure disturbance is distributed over a greater length. Therefore, a sonic boom created by an aircraft according to the present invention is expected to be of lesser intensity than a sonic boom created by a conventional supersonic aircraft of similar weight and otherwise similar size.

The spike can include several sections of varying cross-sectional area. The foremost, or farthest upstream, section of the spike preferably has a cross-sectional area which is characteristically small compared to that of the aircraft's full fuselage or fuselage forebody. Generally, subsequent (farther aft), downstream sections of the spike progressively increase in cross-sectional area. However, a particular downstream section could have a smaller cross-sectional area than one or more upstream sections.

The transitions between sections preferably occur through curved or generally conical transition surfaces. However, other transition region contours are possible, as well. The foremost portion of the spike preferably tapers to a tip at its leading end, also through a curved, conical, or other transition region.

In preferred embodiments, the spike can be retracted into the fuselage when sonic boom mitigation is not needed or desired. For example, it may be desirable to retract the spike into the fuselage when the aircraft is flying at subsonic speeds, flying at supersonic speeds-over areas where sonic boom mitigation is deemed unnecessary (such as over an ocean), or is on the ground (to facilitate taxiing and parking).

The spike can be a single member. However the spike preferably includes two or more sections which can be collapsed telescopically to facilitate retraction of the spike into the fuselage and further to facilitate adjustment of the spike's overall length and the relative position of the foregoing transitions between sections of varying cross-sectional area. For example, in a preferred embodiment, the spike includes a substantially cylindrical center section (which is the foremost section of the spike when the spike is fully or partially extended) surrounded by one or more overlapping, collapsible, annular sections. In other embodiments, the several sections can have other regular or irregular cross-sectional shapes. In such alternate embodiments, the spike can be a single member or it can be configured as two or more collapsible sections in a manner similar to that described above.

When an aircraft embodying such a spike is flown at supersonic speed, the tip of the spike causes an initial shock wave to be formed. Because at least the foremost portion of the spike's cross-section is characteristically smaller than that of the full fuselage or fuselage forebody, this initial shock is of substantially weaker strength than the initial shock that would be generated by the full fuselage or fuselage forebody of an otherwise similar aircraft not having a spike. Further weak shocks are caused by the cross-sectional area transitions between adjacent telescoping sections (or similar discontinuities in a one-piece spike's contour), as discussed above.

The position and shape of the foregoing transition regions define the strength and position of the weak shock waves created thereby. The position and shape of these transition regions are selected to reduce coalescence of the weak shocks into a strong sonic boom at the ground. The optimum position and shape of these transition regions are functions of several variables and can be expected to vary from aircraft to aircraft, based on the particular aircraft's overall configuration. For example, the optimum position and shape of the transition regions may depend on the aircraft's overall length, weight, fineness ratio, wing placement, engine placement, empennage design, etc. In some embodiments of the present invention, the position of such transition regions relative to each other and/or the aircraft's fuselage can be adjusted on demand by incrementally extending or retracting particular sections of the spike.

A spike according to the present invention can be used in connection with conventional fuselage designs. It also can be used in connection with other fuselage designs, for example, without limitation, a fuselage configuration wherein the nose of the fuselage lies on a line substantially defining the bottom of the fuselage. When an aircraft embodying this design flies at supersonic speed, it creates an asymmetrical pressure distribution. The shock waves created by such an aircraft during normal supersonic flight propagate toward the ground with lesser intensity than in other directions. Detailed computational fluid dynamics (CFD) calculations and propagation analyses have shown that such an aircraft can be expected to produce a characteristically weaker acoustic signature at the ground than conventional aircraft. Thus, the foregoing fuselage shaping technique provides an important ingredient for shaping the sonic boom signature to permit supersonic flight over land. In alternate embodiments, at least the forward portion of the spike itself can be shaped in a manner similar to the novel fuselage discussed above. A spike embodying such a configuration causes the portions of the shock waves that propagate toward the ground to be of lesser intensity than the corresponding portions of the shock waves produced by an axisymmetric spike.

Similar benefits can be realized from the placement of a spike as described above at the rear of a supersonic aircraft. Accordingly, the present invention can be embodied as an aircraft having a spike projecting from the aft fuselage or empennage closure thereof in addition to or instead of the forward-projecting spike described above.

DETAILED DESCRIPTION OF THE PREFERRED EMBODIMENT

The concepts underlying the present invention, discussed in detail further below, may be more easily understood in view of the following general discussion of supersonic aircraft.

The propagation characteristics of shock waves created by supersonic aircraft can be analyzed using, for example, CFD analysis methods. These analyses can be complicated because an aircraft includes many components (for example, a fuselage, wings, engines, tailfin, etc.) that contribute to such disturbances. However, such analyses commonly are simplified by modeling the aircraft as a semi-infinite body of revolution. Analyses indicate that shock waves propagate substantially uniformly about supersonic aircraft modeled in this manner.

Figure 3A:
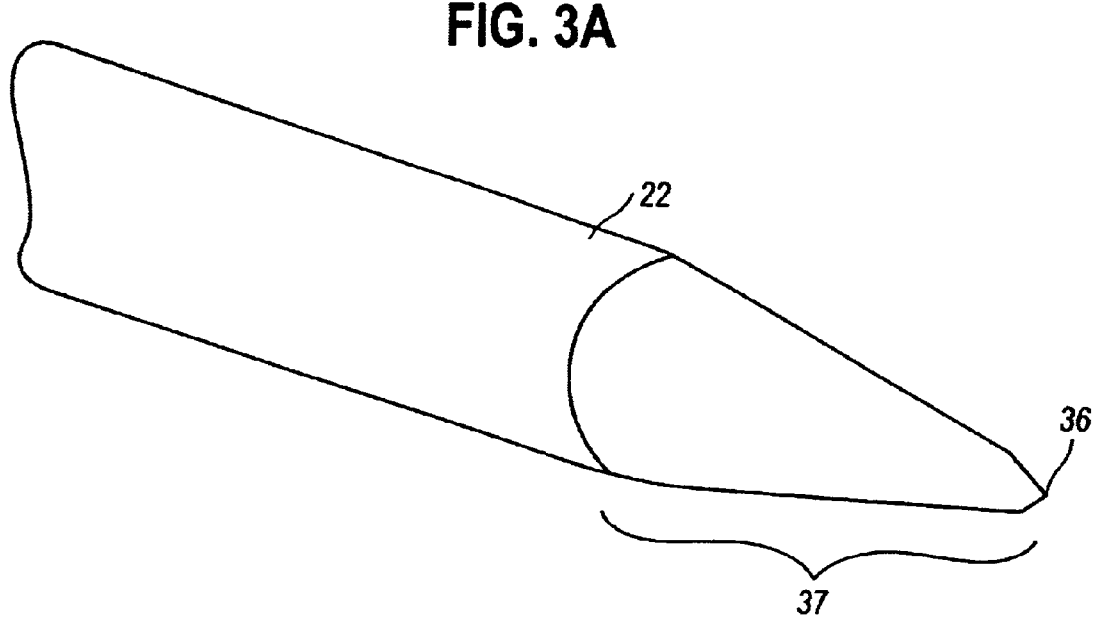
FIG. 3A is a perspective view of an aircraft represented as an equivalent body of revolution, including the effects of lift and volume.
Figure 3B:
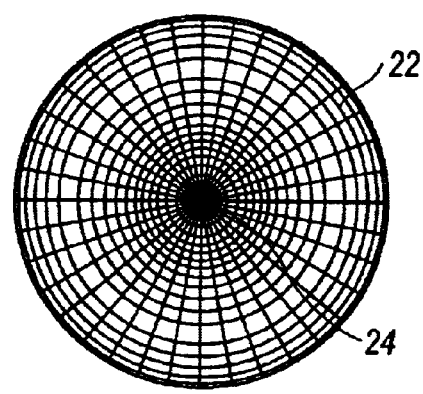
FIG. 3B is a front elevation view of an aircraft represented as an equivalent body of revolution, showing the transition from a substantially cylindrical cross-section to a point.

FIGS. 3A and 3B provide perspective and front elevation views, respectively, of an aircraft represented as a semi-infinite equivalent body of revolution 22, with the front of the aircraft corresponding to point 36 on the equivalent body of revolution. Equivalent body of revolution 22 models the atmospheric disturbance caused by the flight of the aircraft it represents. More particularly, equivalent body of revolution 22 models the atmospheric disturbance caused by the displacement of atmospheric medium by the volume of the aircraft and by the lift generated by the aircraft. Portion 37 of equivalent body of revolution 22 represents the disturbance caused by such volume and lift, while the remainder of equivalent body of revolution 22 represents the disturbance caused by lift only. As such, portion 37 of equivalent body of revolution 22 corresponds to the length of the aircraft represented thereby, while the remainder of equivalent body of revolution 22 corresponds to the wake thereof. As is most clearly illustrated in FIG. 3B, each cross-section of equivalent body of revolution 22 is substantially circular, and the center of each such circular cross-section lies on a common centerline 24.

Figure 4:
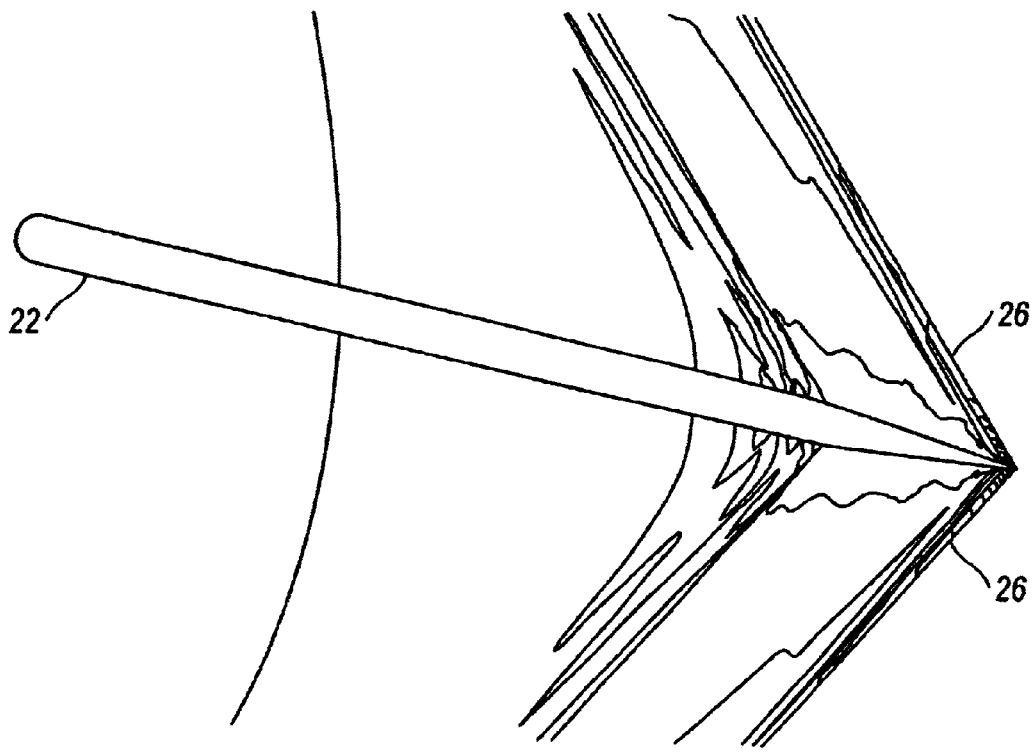
FIG. 4 illustrates the near-field pressure contour produced by an aircraft represented as an equivalent body of revolution flying at supersonic speed.
Figure 5:
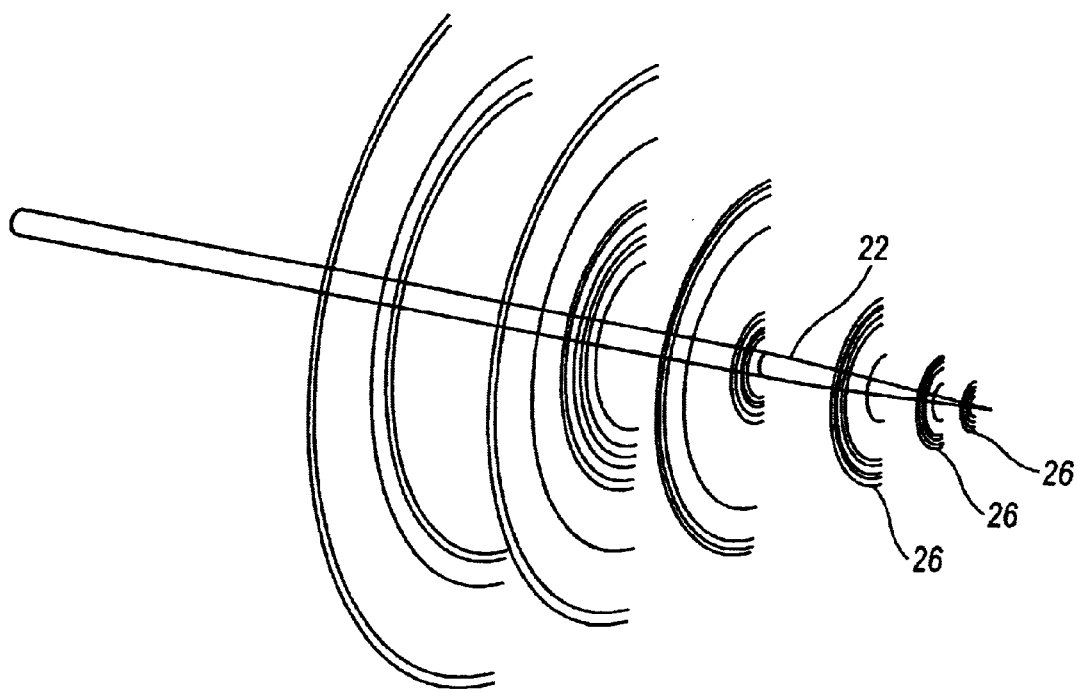
FIG. 5 illustrates the propagation of the pressure disturbance produced by an aircraft represented as an equivalent body of revolution flying at supersonic speed.

FIG. 4 illustrates a computer model of the near-field pressure disturbance that would be created by an aircraft represented as equivalent body of revolution 22 flying at supersonic speed. This pressure disturbance is characterized by bow shock 26 which propagates substantially uniformly, i.e., axisymmetrically, about equivalent body of revolution 22 and, thus, the aircraft it represents. Bow shock 26 propagates in the shape of a Mach cone, as described above. As shown in FIG. 5, bow shock 26 remains axisymmetric about equivalent body of revolution 22 as bow shock 26 propagates far away from the aircraft.

Figure 6A:
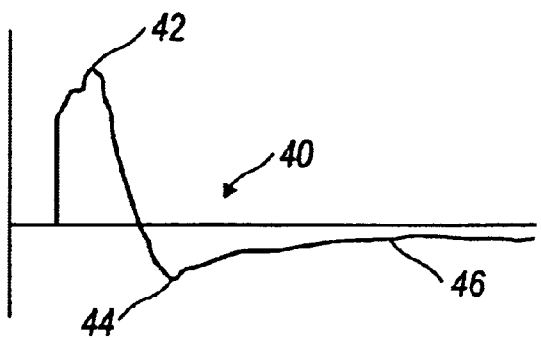
FIG. 6A is a plot of the near-field pressure disturbance caused by an aircraft represented as an equivalent body of revolution traveling at supersonic speed.

FIG. 6A is a graph of the near-field pressure disturbance 40 (the pressure disturbance near the aircraft) caused by an aircraft represented as equivalent body of revolution 22 traveling at supersonic speed as a function of location relative to the aircraft. The x-axis units are $$X - \frac{Y}{\tan(\mu)},$$

where X represents the axial location of a point on the aircraft measured from the front of the aircraft, Y represents the perpendicular distance from the aircraft to the point where the disturbances are being modeled (here, Y is about equal to 2.5 times the length of the of the aircraft) and μ is the Mach angle, as explained above. The y-axis units are ΔP/P, where P represents ambient pressure and ΔP represents the change in local pressure from ambient pressure.

The near-field pressure disturbance is characterized by a positive pressure spike 42 occurring at about the nose of an aircraft represented as equivalent body of revolution 22, followed by a sharp pressure reduction 44 between the nose and tail of such an aircraft to below ambient pressure, followed by a gradual return to ambient pressure 46 at about the tail of such an aircraft.

Figure 6B:
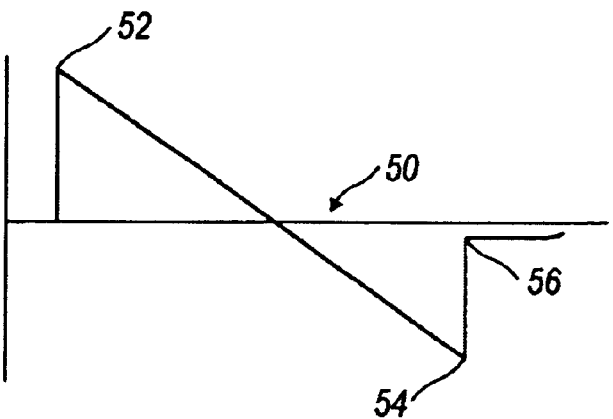
FIG. 6B is a schematic plot of the pressure disturbance at ground level caused by an aircraft represented as an equivalent body of revolution traveling at supersonic speed.

At greater distances Y from an aircraft represented by equivalent body of revolution 22, the individual pressure waves contributing to the near-field distribution illustrated in FIG. 6A coalesce to form a classic sonic boom acoustic signature, or N-wave, 50 as shown schematically in FIG. 6B, wherein the value of Y (i.e., the perpendicular distance from the aircraft to the point where the disturbance is being measured) is taken to be about 500 times the length of the aircraft. The acoustic signature 50 of an aircraft represented as equivalent body of revolution 22, shown schematically in FIG. 6B, is characterized by a positive pressure spike 52 corresponding to the bow shock passing a reference point (e.g., a point on the ground), followed by a linear pressure decrease to sub-ambient pressure 54, followed by a second positive pressure spike 56 corresponding to the tail shock passing the reference point, returning the pressure to ambient pressure.

Figure 1:
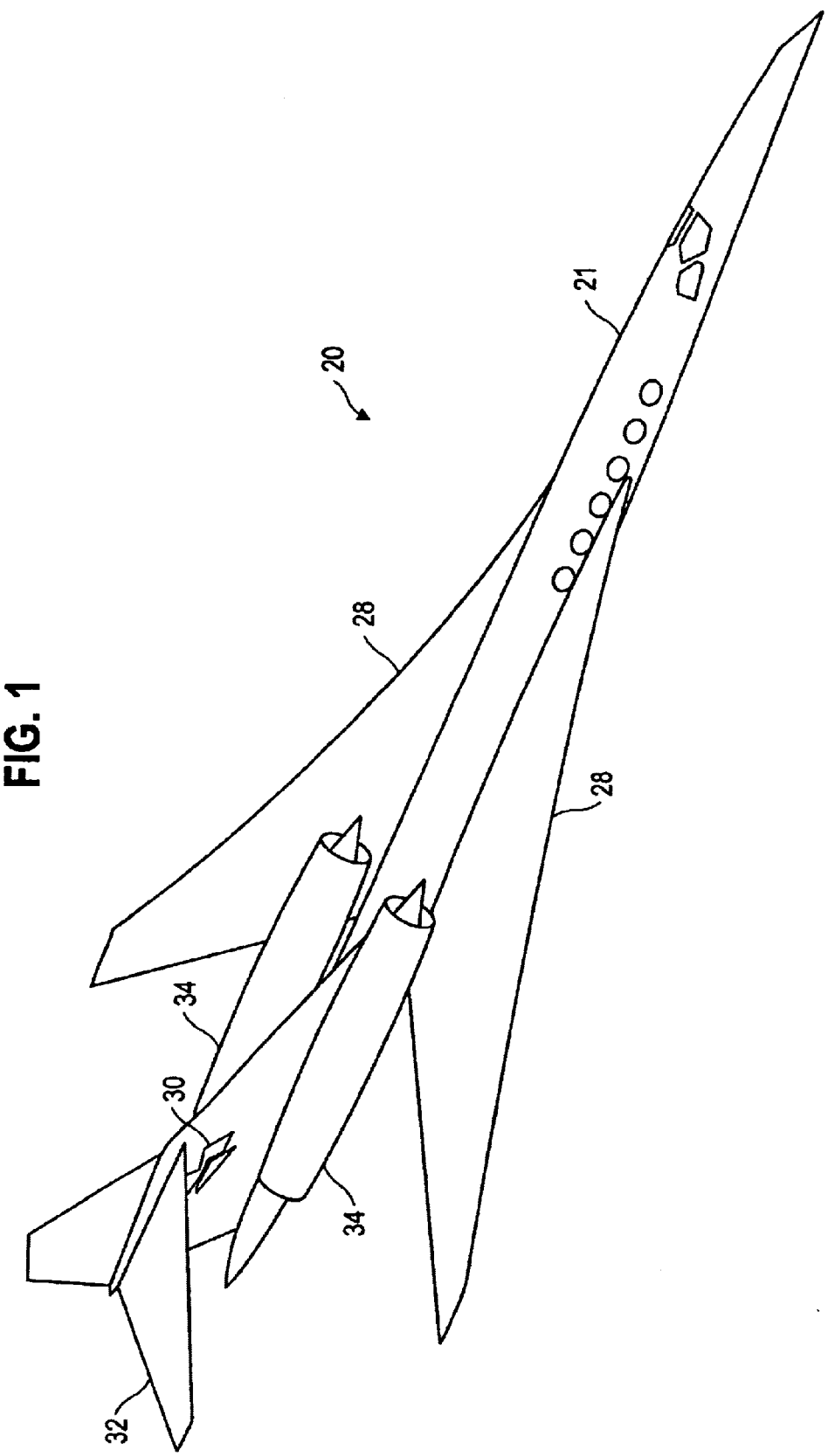
FIG. 1 is a perspective view of-an aircraft having an axisymmetric fuselage.
Figure 2A:
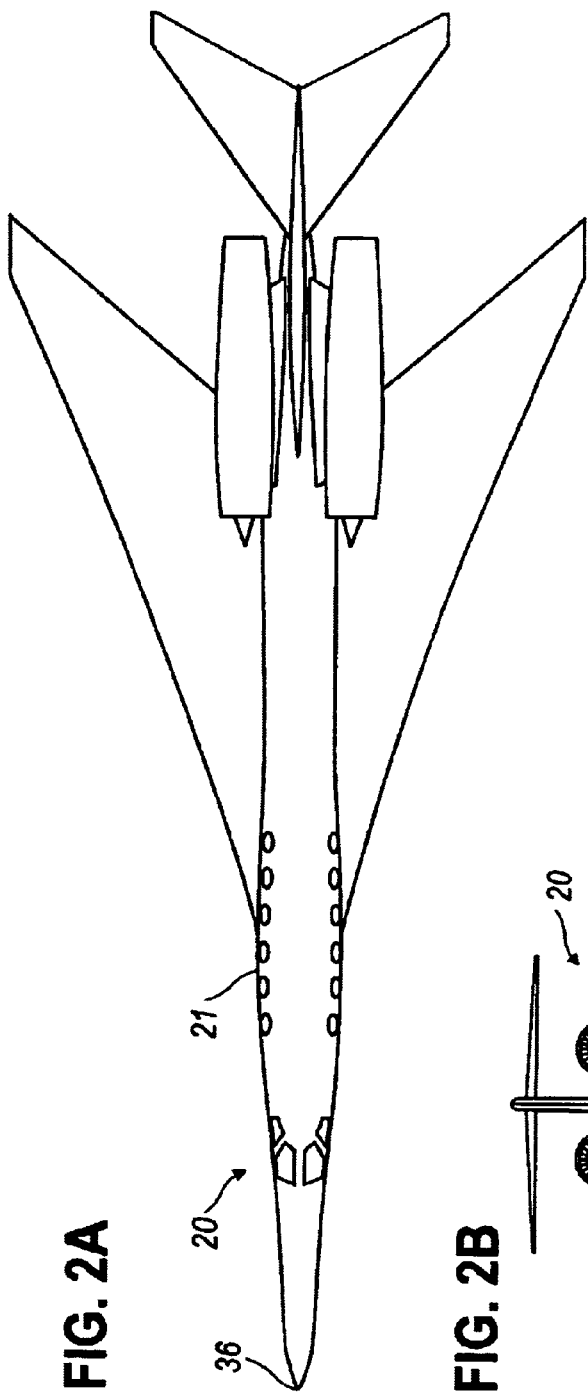
FIG. 2A is a top plan view of the aircraft illustrated in FIG. 1.
Figure 2B:
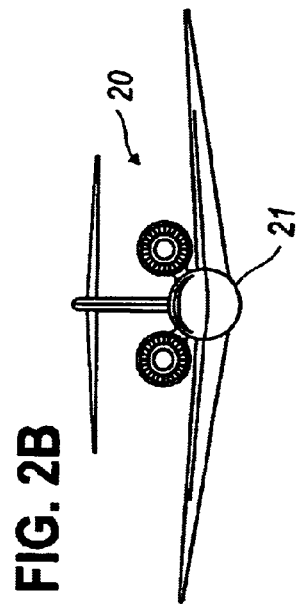
FIG. 2B is a front elevation view of the aircraft illustrated in FIG. 1.
Figure 2C:
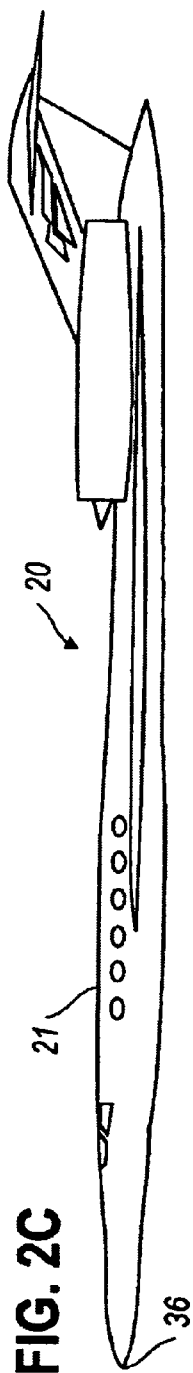
FIG. 2C is a side elevation view of the aircraft illustrated in FIG. 1.

FIG. 1 provides a perspective view of a conventional aircraft 20, which can be readily represented by equivalent body of revolution 22, as shown in FIGS. 3A and 3B. Aircraft 20 includes wings 28 and engines 34 attached to a substantially axisymmetric fuselage 21. Aircraft 20 further includes horizontal stabilizer 32 and tailfin 30, both of which in turn are attached to fuselage 21. FIGS. 2A–2C provide top plan, front elevation, and side elevation views, respectively, of conventional aircraft 20.

Figure 9A:
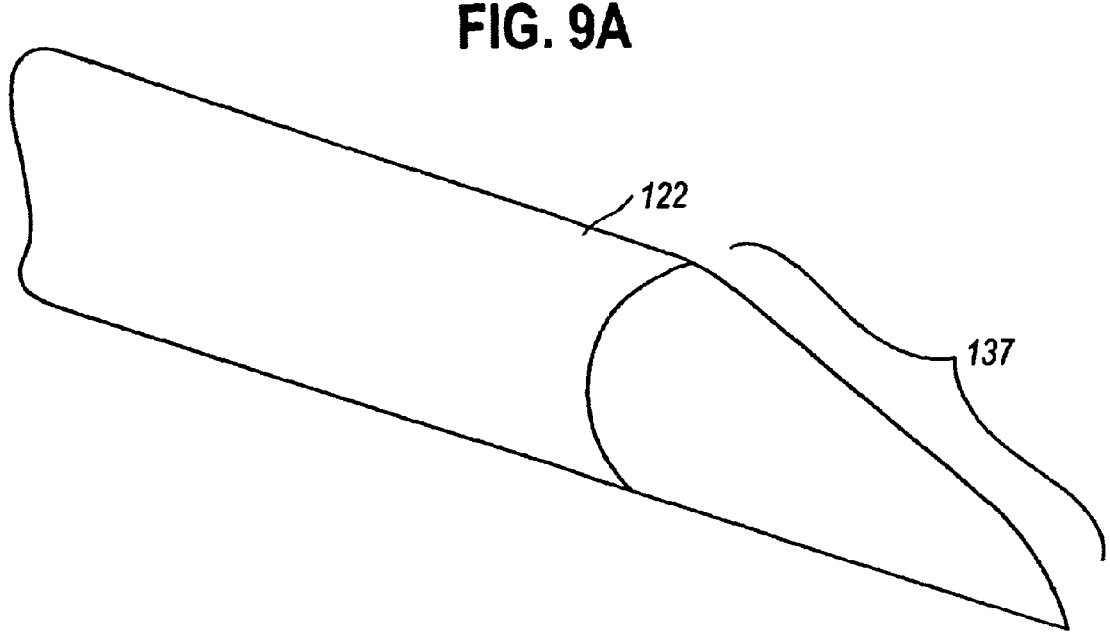
FIG. 9A is a perspective view of an aircraft represented as an equivalent asymmetric body, including the effects of lift and volume.
Figure 9B:
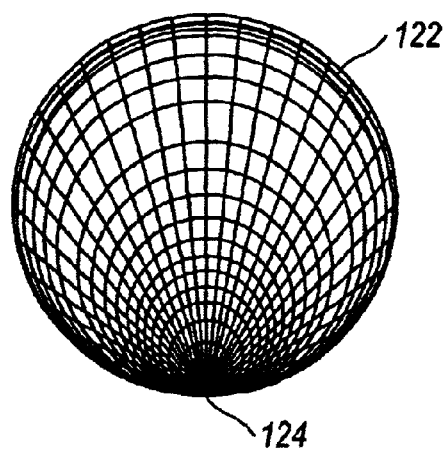
FIG. 9B is a front elevation view of an aircraft represented as an equivalent asymmetric body, showing the transition from a substantially cylindrical cross-section to a point aligned with the bottom of said body.

FIGS. 9A and 9B illustrate perspective and front elevation views of an aircraft represented as equivalent body 122. Equivalent body 122 models the atmospheric disturbance caused by the flight of such an aircraft. More particularly, equivalent body 122 models the atmospheric disturbance caused by the displacement of atmospheric medium by the volume of such an aircraft and by the lift generated by such an aircraft. Portion 137 of equivalent body 122 represents the disturbance caused by such volume and lift, while the remainder of equivalent body 122 represents the disturbance caused by lift only. As such, portion 137 of equivalent body 122 corresponds to the length of the aircraft represented thereby, while the remainder of equivalent body 122 corresponds to the wake thereof.

It can be seen from FIGS. 9A and 9B that equivalent body 122 is not a body of revolution, but is instead asymmetric. These figures, particularly FIG. 9B, further show that each cross-section of equivalent body 122 may be substantially circular. However, whereas the centers of each cross-section of equivalent body of revolution 22 illustrated in, for example, FIGS. 3A and 3B, lie on a common centerline 24, the same is not true of the cross-sections of equivalent body 122. Instead, the bottom of substantially each and every circular cross-section of equivalent body 122 lies substantially on a common line 124. As will be discussed further below, the bottom of at least a substantial portion of the cross-sections comprising at least the forward portion of an aircraft fuselage represented by equivalent body 122 lie on a common line.

Figure 10:
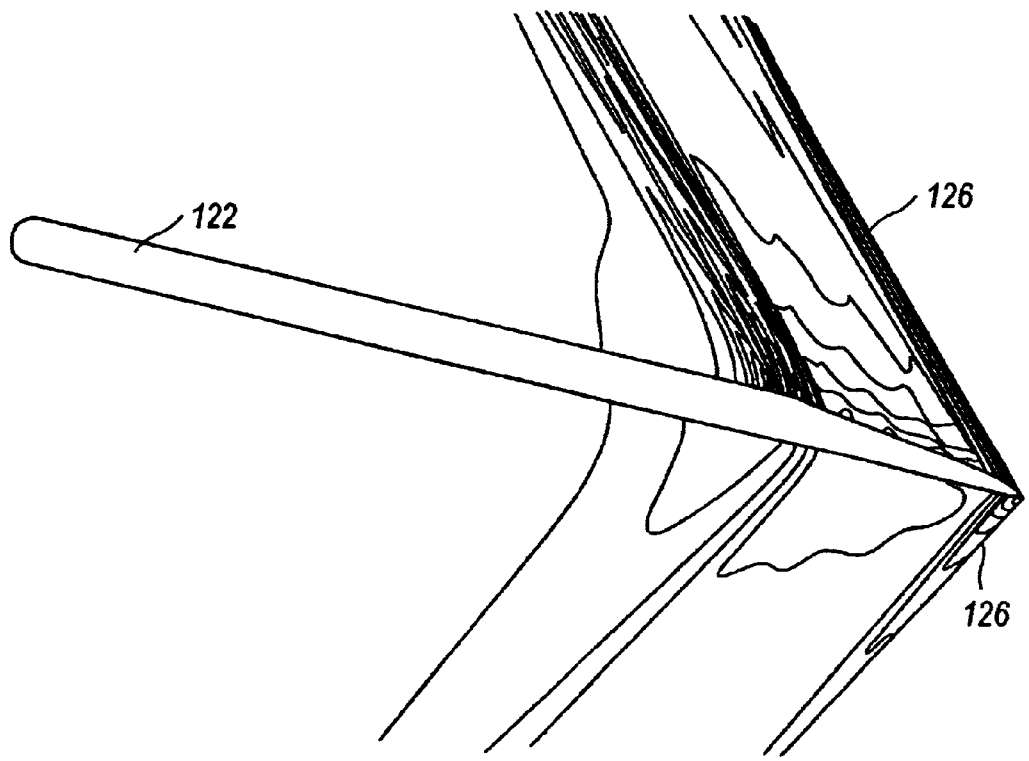
FIG. 10 illustrates the near-field pressure contour produced by an aircraft represented as an equivalent asymmetric body flying at supersonic speed.
Figure 11:
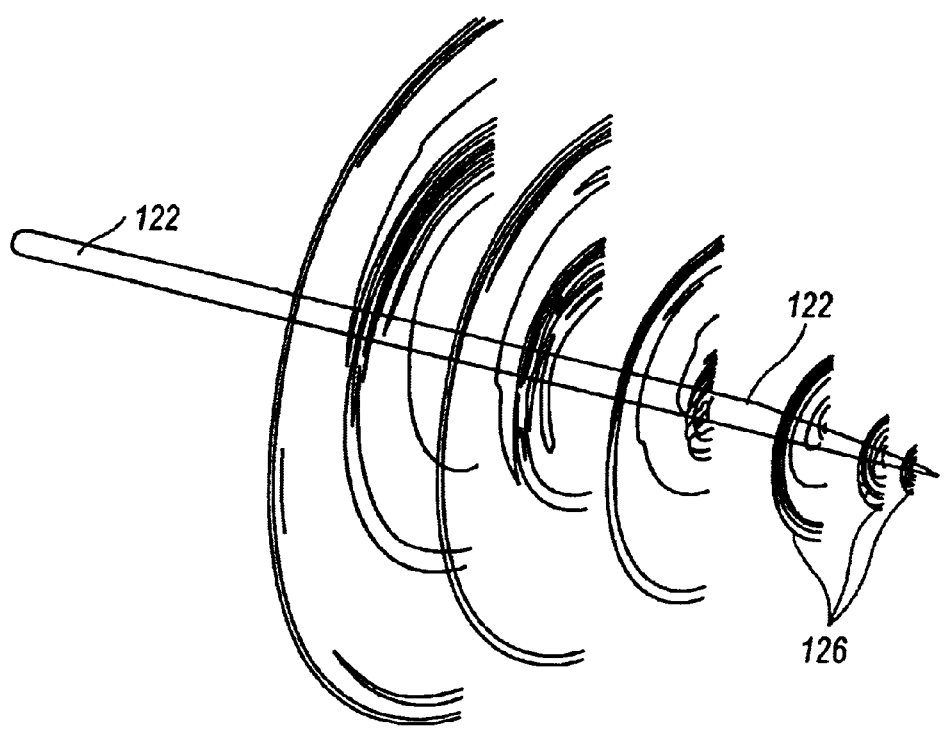
FIG. 11 illustrates the propagation of a pressure disturbance produced by an aircraft represented as equivalent asymmetric body flying at supersonic speed.

FIG. 10 illustrates a computer model of the near-field pressure disturbance that would be created by an aircraft represented by equivalent body 122 flying at supersonic speed. Like the near-field pressure disturbance caused by equivalent body of revolution 22, illustrated in FIG. 4, this pressure disturbance is characterized by bow shock 126 which propagates about equivalent body 122 in the shape of a Mach cone. However, the pressure disturbance caused by equivalent body 122 is markedly different from the pressure disturbance caused by equivalent body of revolution 22, in that the pressure contour associated with the disturbance caused by equivalent body 122 is much denser above and to the sides thereof than beneath it. That is, the pressure contour associated with this disturbance is asymmetric. Further, the pressure contour beneath equivalent body 122 is much less dense than the pressure contour beneath equivalent body of revolution 22, representing a conventional aircraft of similar size, under similar flight conditions. As shown in FIG. 11, the pressure contour resulting from bow shock 126 remains asymmetric about equivalent body 122 as bow shock 126 propagates away from equivalent body 122.

Figure 12A:
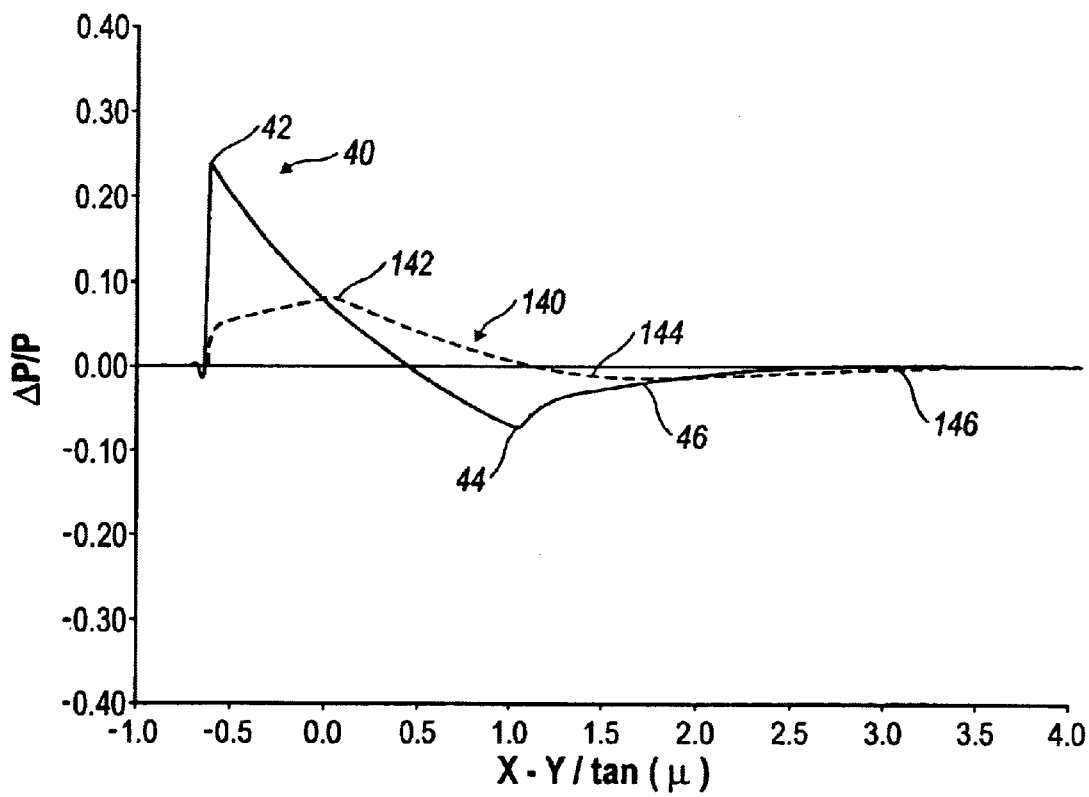
FIG. 12A is a schematic plot of the near-field pressure disturbance below an aircraft represented as an equivalent asymmetric body traveling at supersonic speed, superimposed on a plot of the near-field pressure disturbance below an aircraft represented as an equivalent body of revolution traveling at supersonic speed.

FIG. 12A provides a graph of the near-field (here, Y is about equal to 2.5 times the aircraft length) pressure disturbance 140 below an aircraft represented by equivalent body 122 traveling at supersonic speed, superimposed on the graph of the near-field pressure disturbance 40 below an aircraft represented by equivalent body of revolution 22 traveling at supersonic speed, as illustrated in FIG. 6A. The peak pressure rise 142 resulting from supersonic flight of an aircraft represented by equivalent body 122 is of substantially lesser magnitude than the peak pressure rise 42 caused by an aircraft represented by equivalent body of revolution 22 under similar flight conditions. Similarly, the pressure drop 144 to below ambient associated with an aircraft represented by equivalent body 122 is of substantially lesser magnitude than pressure drop 44 to below ambient caused by an aircraft represented by equivalent body of revolution 22 under similar flight conditions. Likewise, the pressure return 146 to ambient associated with an aircraft represented by equivalent body 122 is of lesser magnitude than pressure return 46 to ambient caused by an aircraft of similar size represented by equivalent body of revolution 22, under similar flight conditions.

Figure 12B:
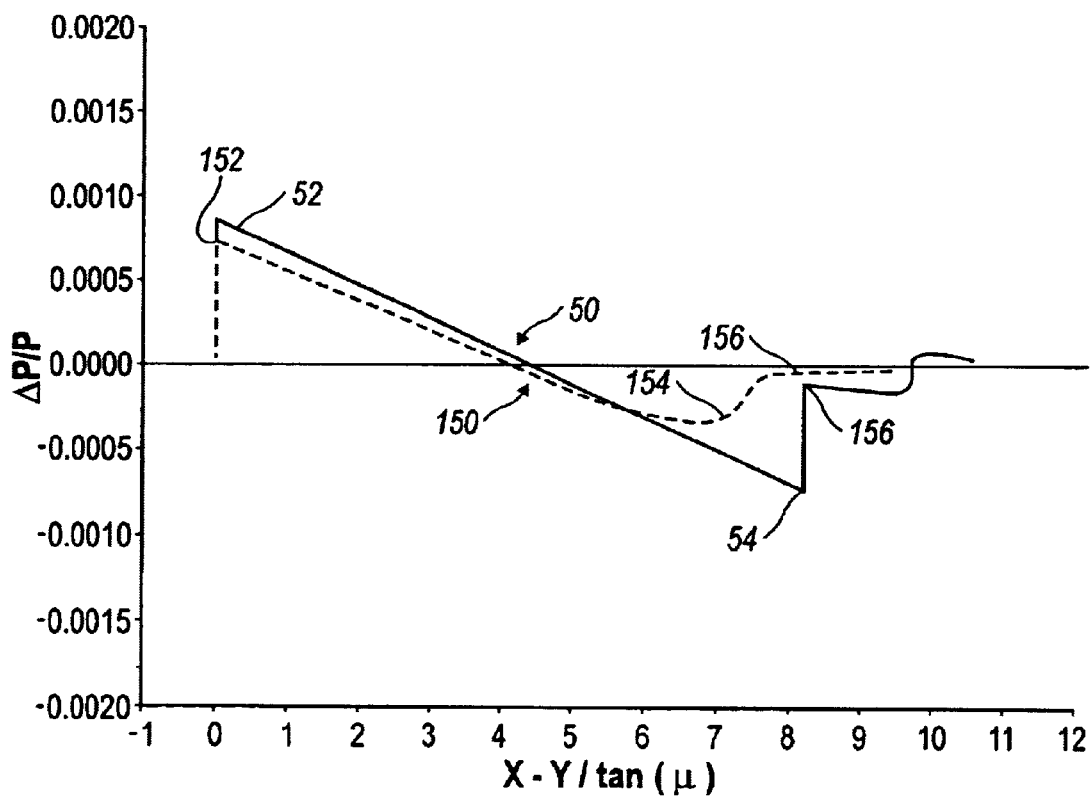
FIG. 12B is a plot of the pressure disturbance at ground level caused by an aircraft represented as an equivalent asymmetric body traveling at supersonic speed, superimposed on a plot of the pressure disturbance at ground level caused by an aircraft represented as an equivalent body of revolution traveling at supersonic speed.

FIG. 12B provides a graph of the far-field (here, Y is about equal to 500 times the aircraft length) pressure disturbance 150 caused by an aircraft represented by equivalent body 122 traveling at supersonic speed, superimposed on the graph of the far-field pressure disturbance 50 caused by an aircraft represented by equivalent body of revolution 22 traveling at supersonic speed, as illustrated in FIG. 6A. The peak pressure rise 152 resulting from supersonic flight of an aircraft represented by equivalent body 122 is of substantially lesser magnitude than the peak pressure rise 52 caused by an aircraft of similar size represented by equivalent body of revolution 22, under similar flight conditions. Similarly, the pressure drop to below ambient 154 associated with an aircraft represented by equivalent body 122 is of substantially lesser magnitude than pressure drop 54 to below ambient caused by an aircraft represented by equivalent body of revolution 22 under similar flight conditions. Likewise, the pressure return to ambient 156 associated with an aircraft represented by equivalent body 122 is of substantially lesser magnitude than pressure return 56 to ambient caused by an aircraft represented by equivalent body of revolution 22 under similar flight conditions.

CFD analysis thus shows that the pressure disturbance above an aircraft embodying a fuselage configuration represented by equivalent body 122 is significantly greater than the pressure disturbance below such an aircraft. Relatively strong disturbances, shown as tightly packed contour lines in FIGS. 10 and 11, propagate upward, away from the ground. Substantially weaker disturbances, shown as loosely packed contour lines in FIGS. 10 and 11, propagate towards the ground. Further, the ground-directed disturbances produced by an aircraft represented by equivalent body 122 are substantially weaker than the ground-directed disturbances produced by an aircraft represented by equivalent body of revolution 22. Thus, the ground-directed disturbances produced by an aircraft represented by equivalent body 122 are expected to result in significantly weaker sonic booms compared to those produced by an aircraft represented by equivalent body of revolution 22.

Figure 7:
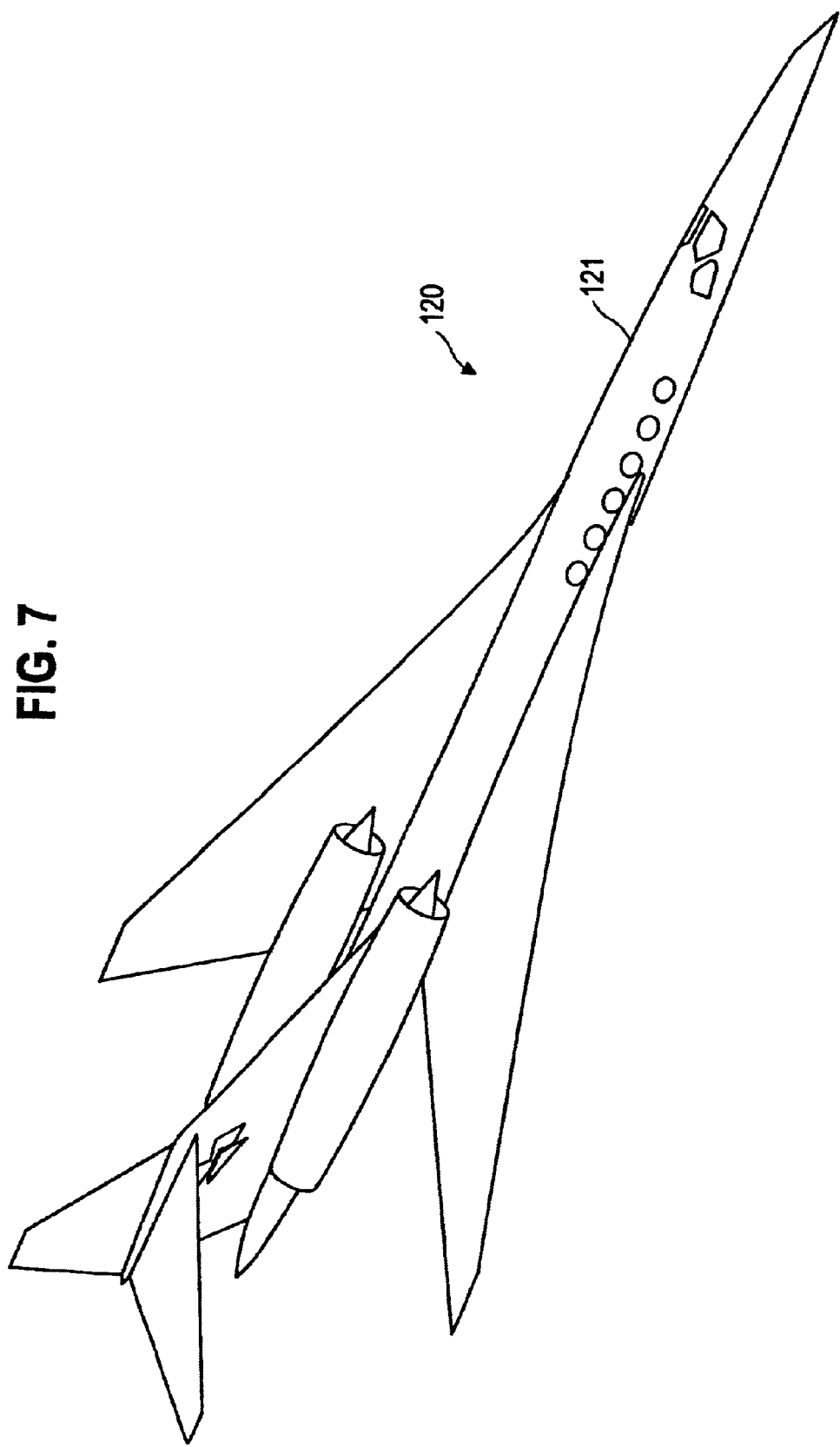
FIG. 7 is a perspective view of an aircraft having an asymmetric fuselage.
Figure 8A:
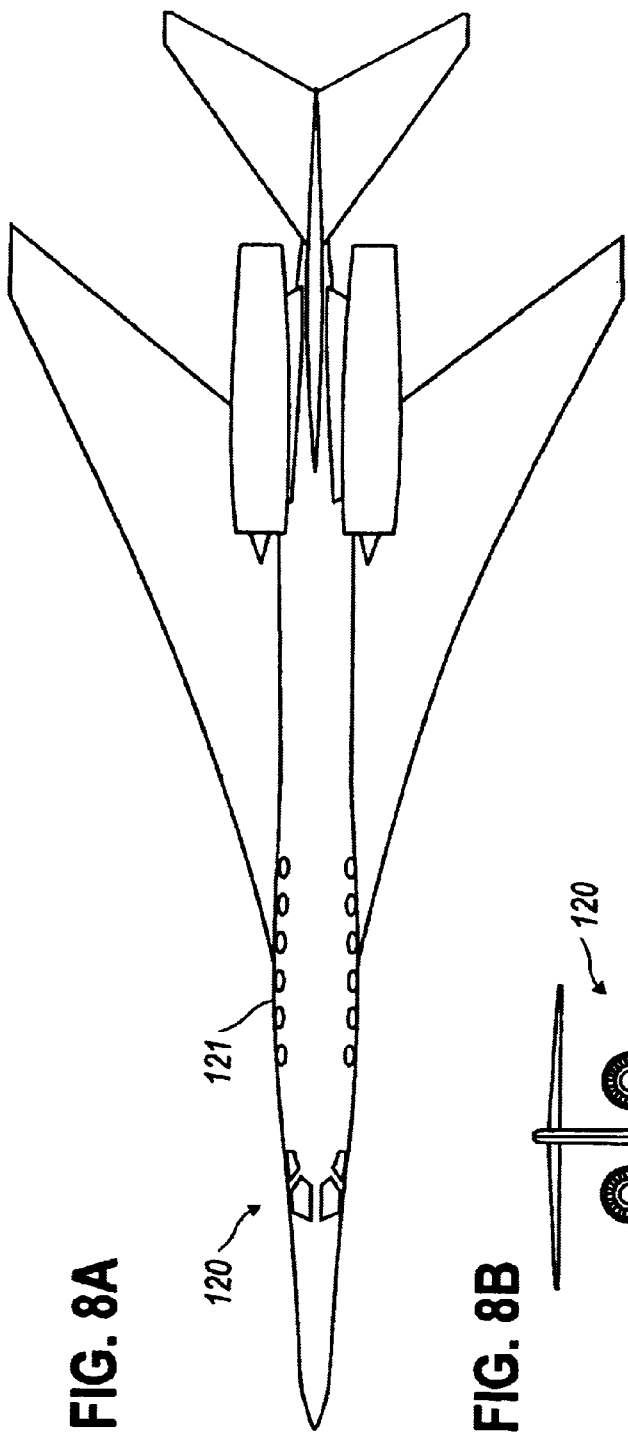
FIG. 8A is a top plan view of the aircraft illustrated in FIG. 7.
Figure 8B:
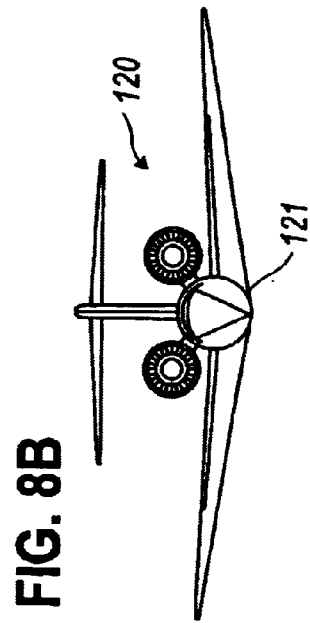
FIG. 8B is a front elevation view of the aircraft illustrated in FIG. 7.
Figure 8C:
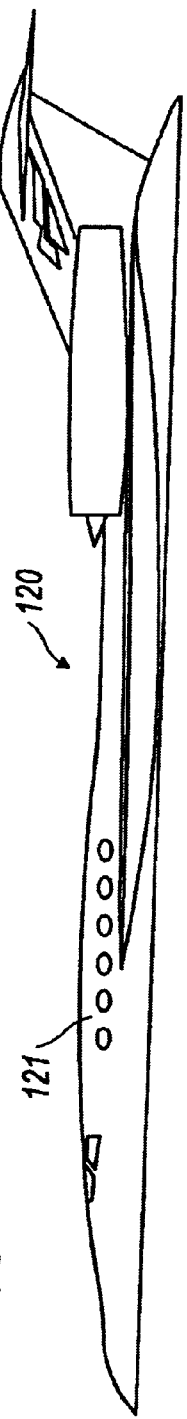
FIG. 8C is a side elevation view of the aircraft illustrated in FIG. 7.

FIG. 7 illustrates a perspective view of an aircraft 120 having a fuselage design represented by equivalent body 122. FIGS. 8A–8C illustrate top plan, front elevation, and side elevation views of aircraft 120. The foregoing figures illustrate an embodiment wherein the bottom of substantially every cross-section of fuselage 121 lies substantially on a line located at the intersection of the bottom of fuselage 121 with a plane tangent to the bottom of fuselage 121, as described above. In certain alternate embodiments, many of the benefits of the foregoing fuselage design can be realized even if the bottom of some cross-sections of fuselage 121 do not lie on such a line. For example, in one alternate embodiment (not shown), fuselage 121 is asymmetric at its nose, but axisymmetric at its tail. In this embodiment, the bow shock experienced at ground level is expected to be of lesser magnitude than the bow shock resulting from supersonic flight of an aircraft having an axisymmetric nose. Other alternate embodiments (not shown) may include discontinuities in the configuration of the fuselage bottom such that some cross-sections of the fuselage do not include a point which lies on a line formed by the intersection of the bottom of the fuselage and a plane tangent thereto. In fact, physical limitations associated with aircraft construction may in some cases preclude a configuration wherein the bottom of each and every fuselage cross-section lies on such a line.

Further, although fuselage 121 is shown in FIGS. 7 and 8A–8C as having substantially circular cross-sections, fuselage 121 could have different cross-sectional shapes (or combinations of cross-sectional shapes) in other embodiments. Examples of such other cross-sectional shapes (not shown) include, without limitation, non-circular curved shapes, partially circular shapes, partially non-circular curved shapes, and angled shapes (e.g., a "V" shape). Further, fuselage 121 can include more than one of the foregoing (or other) cross-sectional shapes along its length.

Figure 13:
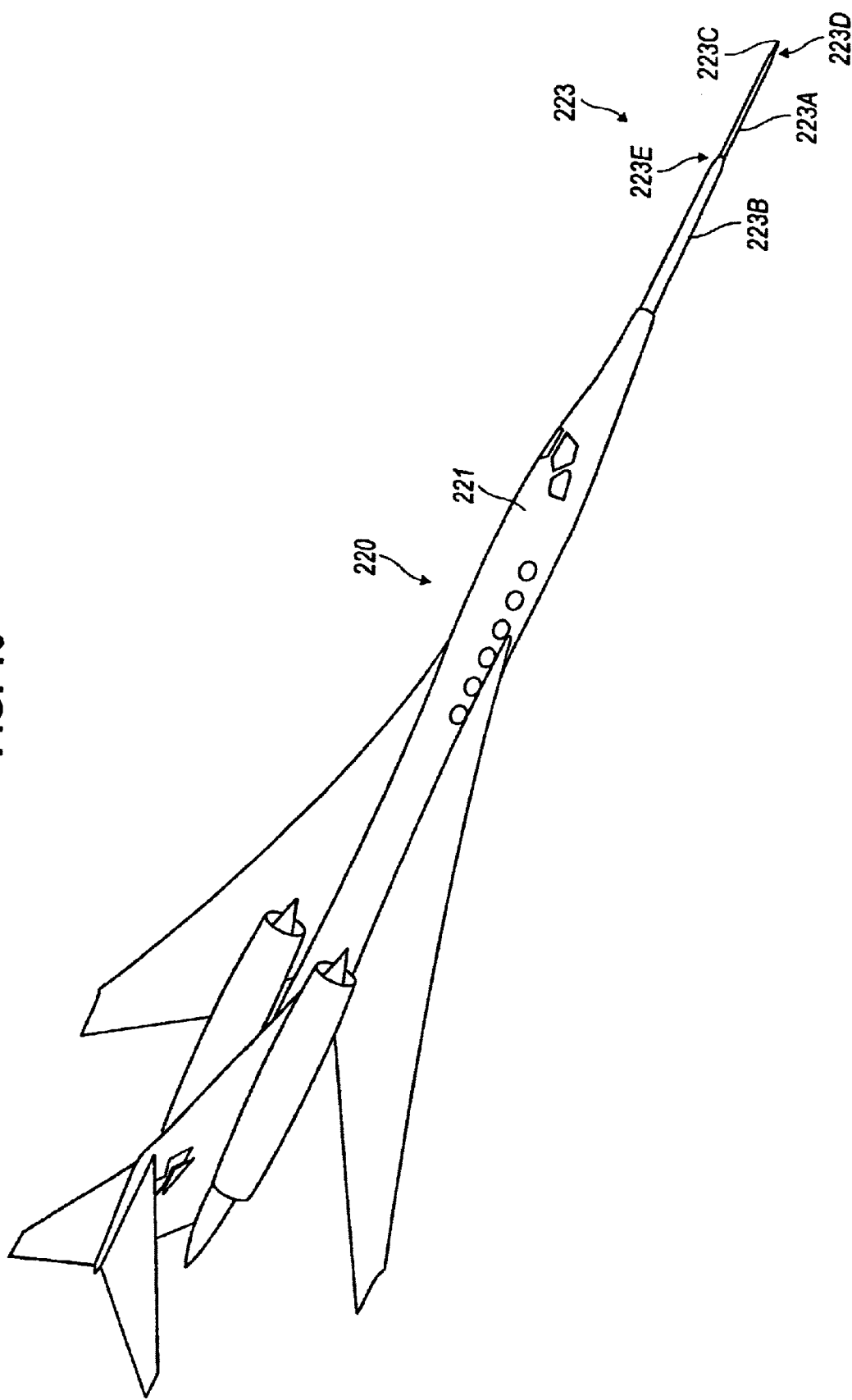
FIG. 13 is a perspective view of a supersonic aircraft having a spike extending from its nose according to the present invention.

The present invention provides further improvements in aircraft design directed to reducing the intensity of sonic booms created by aircraft flying at supersonic speed. An aircraft according to a preferred embodiment of the present invention includes a spike extending from the front thereof. For example, FIG. 13 illustrates supersonic aircraft 220 having spike 223 extending forward from fuselage 221, generally in the direction of normal flight. Fuselage 221 can be otherwise conventional, similar to fuselage 21 described above, or it can be specially shaped, similar to fuselage 121 described above. Alternatively, fuselage 221 can have other configurations.

Spike 223 preferably can be at least partially retracted into the fuselage of the aircraft on demand. For example, it may be desirable to retract spike 223 into fuselage 221 when aircraft 220 is flown at subsonic speed, flown at supersonic speed over areas where sonic booms are deemed acceptable (such as over an ocean), or on the ground (to facilitate taxiing and parking).

Figure 14:
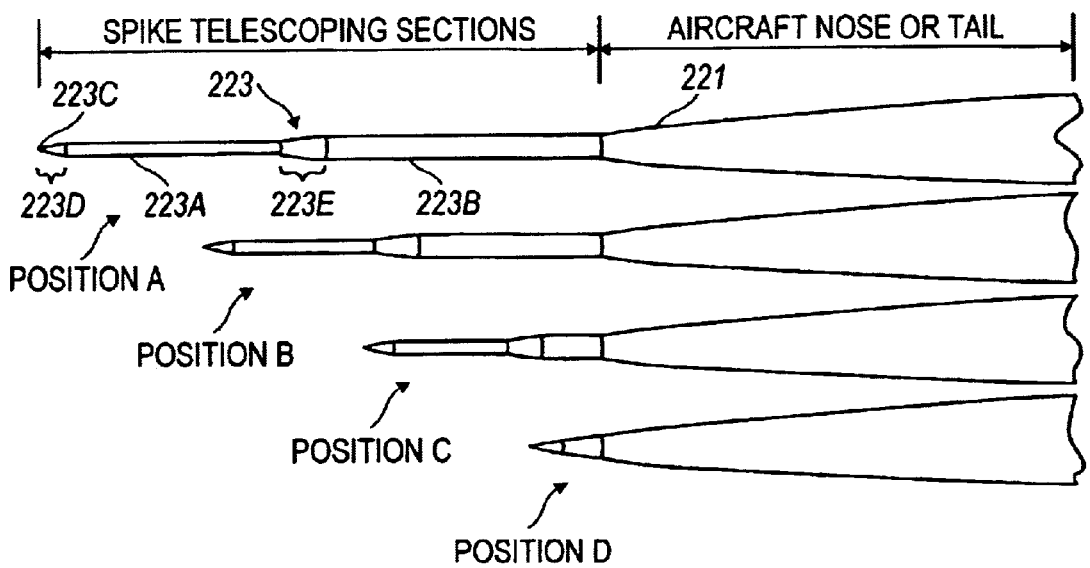
FIG. 14 is a side elevation view of an aircraft nose and/or tail outfitted with a telescopically collapsible spike according to the present invention, showing the spike in various degrees of extension.

In a preferred embodiment, spike 223 has a forward section 223A and a rearward section 223B. With reference to FIG. 14, forward section 223A has a generally smaller nominal cross-sectional area than does rearward section 223B, which, in turn, has a generally smaller nominal cross-sectional area than does fuselage 221. Forward section 223A tapers toward (i.e., to or substantially to) a point 223C through transition region 223D. In alternate embodiments, forward section 223A can taper toward other cross sections. For example, without limitation, forward section 223A can taper toward an edge, such as a knife edge, which can be oriented vertically, horizontally, or in any other desired manner (not shown).

The transition from forward section 223A to rearward section 223B is through transition region 223E. Transition region 223D is shown as substantially conical and transition region 223E is shown as substantially frusto-conical. However, these transition regions can have curved or other contours as well. In other embodiments (not shown), spike 223 can have one or more additional sections (not shown) between rearward section 223B and fuselage 221. An additional transition region, as discussed above, would be associated with each such additional section. Generally, the nominal cross-sectional area of any such additional section would be greater than the nominal cross-sectional area of a section forward thereof and smaller than that of a section rearward thereof. However, it is possible that such an intermediate section could have a nominal cross-sectional area smaller than that of a section forward thereof and/or larger than that of a section rearward thereof. Generally, the nominal cross-sectional area of any section of spike 223 is substantially smaller than the nominal cross sectional area of fuselage 221. Although the nominal cross-sectional area of each section of spike 223 is shown to be substantially uniform over the length thereof, the cross-sectional area of each section can vary over the length thereof.

FIGS. 13 and 14 illustrate spike 223 as having substantially cylindrical cross-sections. In other embodiments (not shown), spike 223 can have other regularly or irregularly shaped cross-sections.

Spike 223 can be embodied as a single member. However, it is preferred that sections 223A and 223B (as well as any additional sections, as discussed above) be separate elements which are collapsible in a telescoping manner. FIG. 14 shows a preferred embodiment of a telescopically collapsible spike 223 in an extended Position A, a retracted Position D, and two intermediate Positions B and C.

In alternate embodiments (not shown), spike 223 could be a single, tapered section. Alternatively, spike 223 could have several sections, one or more of which are tapered continuously over the length thereof. The several sections could be collapsible, or they could be embodied as a single member.

When an aircraft 221 embodying a spike 223 as illustrated in FIGS. 13 and 14 is flown at supersonic speed, the tip of the spike causes an initial shock wave to be formed. Because the spike's cross-section is substantially smaller than that of the aircraft's full fuselage or fuselage forebody, this initial shock is substantially weaker than the initial shock that would be created by the full fuselage or fuselage forebody of an otherwise similar aircraft not having a spike. A further weak shock is caused by each further transition region (such as transition region 223E) between adjacent sections (such as sections 223A and 223B) of spike 223. As the number of sections of spike 223 increases, the number of transition regions increases, and the number of weak shocks created thereby increases.

The position and shape of the transition regions define the strength and position of the weak shocks created thereby.

The position and shape of these transition regions are selected to reduce coalescence of the weak shocks into a strong shock and thus reduce the intensity of a sonic boom at ground level resulting from these shocks. As discussed above, the optimum position and shape of these transition regions are functions of several variables and can be expected to vary from aircraft to aircraft, based on the particular aircraft's overall configuration. For example, the optimum position and shape of the transition regions may depend on the aircraft's overall length, weight, fineness ratio, wing placement, engine placement, empennage design, etc. In some embodiments of the present invention, the position of such transition regions relative to each other and/or the aircraft's fuselage can be adjusted on demand by incrementally extending or retracting particular sections of the spike. For example, referring to FIG. 14, it may be desirable under certain circumstances to operate the aircraft with spike 223 in Position B, Position C, or another intermediate position (not shown).

Figure 15:
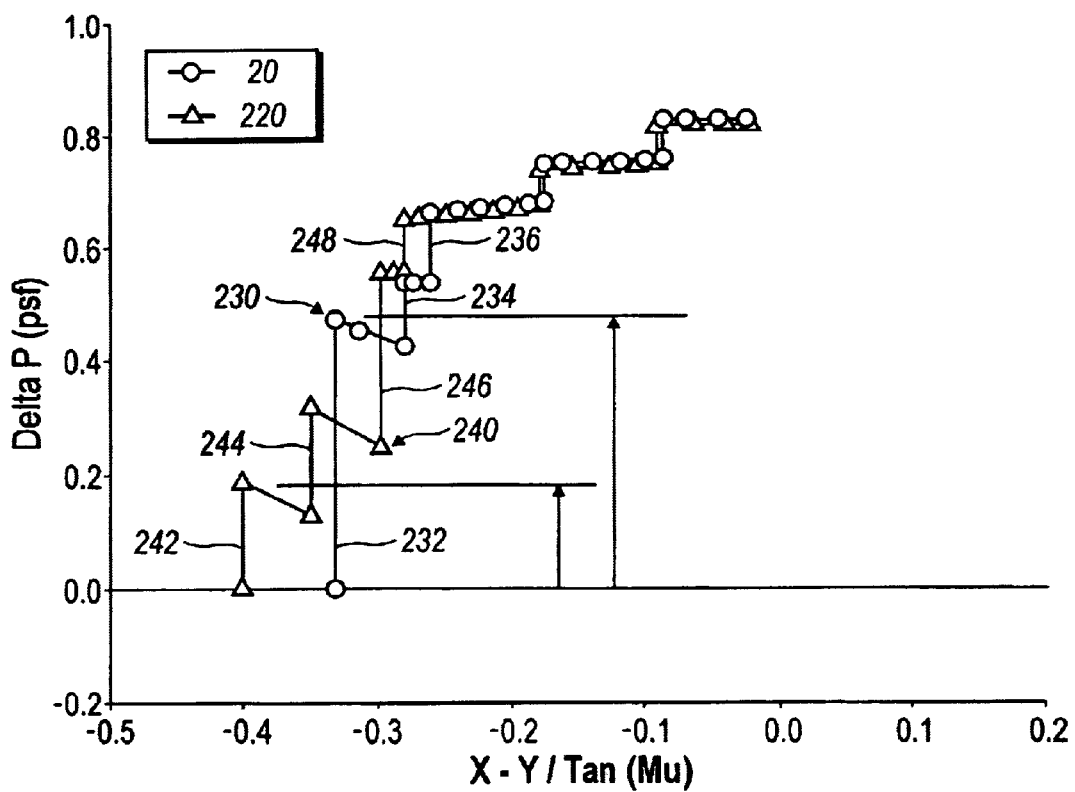
FIG. 15 is a plot of the initial pressure rise associated with the bow shock created by a conventional aircraft flying at supersonic speed superimposed on a plot of the initial pressure rise associated with the bow shock created by an aircraft outfitted with a spike according to the present invention flying at supersonic speed.

FIG. 15 illustrates graphically the effect of spike 223 on the shock created by an aircraft equipped therewith during supersonic flight. FIG. 15 provides a plot 230 of the pressure rise associated with the bow shock created by a conventional aircraft flying at supersonic speed, superimposed on a plot 240 of the pressure rise associated with the bow shock created by an aircraft having a spike 223 in the extended position flying at supersonic speed. FIG. 15 shows that aircraft 220 having spike 223 flown at supersonic speed produces a substantially lower initial pressure rise 242 than the initial pressure rise 232 created by a conventional aircraft of similar size under similar flight conditions. Further, the peak pressure rise resulting from supersonic flight of aircraft 220 having spike 223 is reached through a series of relatively small step increases in pressure 242, 244, 246, 248, whereas the peak pressure rise resulting from supersonic flight of conventional aircraft 220 is reached through a series of fewer, but larger, step increases in pressure 232, 234, 236. Generally, the sonic boom at ground level will be reduced where the peak pressure rise is realized through a longer series of smaller pressure increases, instead of through a shorter series of larger pressure increases.

Spike 223 can be used in connection with otherwise conventional supersonic aircraft to effect a reduction in the sonic boom experienced at ground level. Spike 223 also can be used in connection with supersonic aircraft having a specially shaped fuselage 121 as described above. In certain embodiments (not shown), spike 223 itself can be specially shaped in a manner similar to fuselage 121.

An aircraft according to the present invention can have a second spike (not shown) similar to spike 223 extending from the aft fuselage or empennage closure thereof in addition to spike 223 extending from the forward fuselage thereof. In alternate embodiments, such an aircraft can have such a rear-projecting spike (not shown) instead of forward projecting spike 223.

While the foregoing embodiments of the invention illustrate a supersonic passenger jet, it should be understood that the configuration can be used in connection with other types of aircraft and aerospace vehicles.

Whereas the present invention is described herein with respect to specific embodiments thereof, it will be understood that various changes and modifications may be made by one skilled in the art without departing from the scope of the invention, and it is intended that the invention encompass such changes and modifications as fall within the scope of the appended claims.

We claim:
1. An aerospace vehicle configured to reduce the effects of a sonic boom created by said vehicle when said vehicle is flown at supersonic speed, said aerospace vehicle comprising:
   a fuselage having a leading end, a trailing end, a top, and a bottom; and
   a first spike operably associated with said leading end of said fuselage, said first spike having a leading end portion and a trailing end portion, said leading end portion tapering toward a predetermined cross-section;
   said first spike comprising a first section aft of said leading end portion, wherein said first section has a first cross-sectional area;
   said first spike further comprising a first transition region between said predetermined cross-section and said first section;
   said first spike further comprising a second section aft of said first section, wherein said second section has a second cross-sectional area, said second cross-sectional area being different than said first cross-sectional area; and
   said first spike further comprising a second transition region between said first section and said second section.

2. The aerospace vehicle of claim 1 wherein said second cross-sectional area is greater than said first cross-sectional area.

3. The aerospace vehicle of claim 1 wherein at least one of said first and second transition regions comprises at least one surface discontinuity.

4. The aerospace vehicle of claim 1 wherein said spike is selectively extendable from said leading end of said fuselage.

5. The aerospace vehicle of claim 1 wherein said spike is selectively retractable into said leading end of said fuselage.

6. The aerospace vehicle of claim 1 wherein one of said first and second sections is selectively collapsible into the other of said first and second sections.

7. The aerospace vehicle of claim 1 wherein said spike further comprises a third section aft of said second section, said third section having a third cross-sectional area, said third cross-sectional area being different than said second cross-sectional area, and a third transition region between said second section and said third section.

8. The aerospace vehicle of claim 7 wherein said third cross-sectional area is greater than said second cross-sectional area.

9. The aerospace vehicle of claim 7 wherein one of said second and third sections is selectively collapsible into the other of said second and third sections.

10. The aerospace vehicle of claim 1 further comprising a second spike operably associated with said trailing end of said aircraft.

11. The aerospace vehicle of claim 1 wherein said leading end portion tapers toward a point.

12. The aerospace vehicle of claim 1 wherein said leading end portion tapers toward an edge.

13. An aerospace vehicle configured to reduce the effects of a sonic boom created by said vehicle when said vehicle is flown a supersonic speed, said aerospace vehicle comprising:
   a fuselage having a leading end, a trailing end, a top, and a bottom;
   a first spike operably associated with said leading end of said fuselage, said first spike having a second section aft of a first section that is aft of a leading end portion, said first and second sections having a second transition region therebetween and each of said sections having different cross-sectional areas, said leading end portion of said first spike tapering toward a predetermined cross-section with a first transition region between said predetermined cross-section and said first section; and second spike operably associated with said trailing end of said fuselage.

14. An aerospace vehicle configured to reduce the effects of a sonic boom created by said vehicle when said vehicle is flown a supersonic speed, said aerospace vehicle comprising:

a fuselage having a leading end, a trailing end, a top, and a bottom; and a first spike operably associated with said leading end of said fuselage, said first spike having a second section aft of a first section that is aft of a leading end portion, said first and second sections having a second transition region therebetween and each of said sections having different cross-sectional areas, said leading end portion of said first spike tapering toward a predetermined cross-section with a first transition region between said predetermined cross-section and said first section;

wherein the intersection of at least a portion of said bottom of said fuselage and a first plane tangent to said bottom of said fuselage substantially defines a line segment, said leading end of said fuselage being configured so that the forward-most point of said fuselage lies on said line segment.

15. The aerospace vehicle of claim 14 wherein said first spike is selectively extendable from said leading end of said fuselage.

16. The aerospace vehicle of claim 14 wherein said first spike is selectively retractable into said fuselage.

17. The aerospace vehicle of claim 14 wherein said first spike comprises a first section proximate said leading end of said first spike and a second section aft of said first section.

18. The aerospace vehicle of claim 17 wherein said first section has a first cross-sectional area and said second section has a second cross-sectional area, said second cross-sectional area being different than said first cross-sectional area.

19. The aerospace vehicle of claim 18 wherein said second cross-sectional area is greater than said first cross-sectional area.

20. The aerospace vehicle of claim 18 further comprising a first transition region between said first section and said second section.

21. The aerospace vehicle of claim 20 wherein said first transition region comprises at least one surface discontinuity.

22. The aerospace vehicle of claim 18 wherein one of said first and second sections is selectively collapsible into the other of said first and second sections.

23. The aerospace vehicle of claim 18 further comprising a third section aft of said second section, said third section having a third cross-sectional area, said third cross-sectional area being different than said second cross-sectional area.

24. The aerospace vehicle of claim 23 wherein said third cross-sectional area is greater than said second cross-sectional area.

25. The aerospace vehicle of claim 23 further comprising a second transition region between said second section and said third section.

26. The aerospace vehicle of claim 25 wherein said second transition region comprises at least one surface discontinuity.

27. The aerospace vehicle of claim 23 wherein one of said second and third sections is selectively collapsible into the other of said second and third sections.

28. The aerospace vehicle of claim 14 wherein the intersection of at least a portion of said bottom of said first spike and a first plane tangent to said bottom of said first spike substantially defines a line segment, said leading end of said first spike being configured so that the forward-most point of said first spike lies on said line segment.

29. The aerospace vehicle of claim 14 further comprising a second spike operably associated with said trailing end of said fuselage.

30. An aerospace vehicle configured to reduce the effects of a sonic boom created by said vehicle when said vehicle is flown a supersonic speed, said aerospace vehicle comprising:

a fuselage having a leading end, a trailing end, a top, and a bottom; and a first spike operably associated with said leading end of said fuselage, said first spike having a leading end, a trailing end, and a bottom, and said first spike having a second section aft of a first section that is aft of a leading end portion, said first and second sections having a second transition region therebetween and each of said sections having different cross-sectional areas, said leading end portion of said first spike tapering toward a predetermined cross-section with a first transition region between said predetermined cross-section and said first section;

wherein the intersection of at least a portion of said bottom of said first spike and a first plane tangent to said bottom of said first spike substantially defines a line segment, said leading end of said first spike being configured so that the forward-most portion of said first spike lies on said line segment.

31. The aerospace vehicle of claim 30 further comprising a second spike operably associated with said trailing end of said fuselage.

32. A method of reducing the effects of a sonic boom created by an aerospace vehicle when said vehicle is flown at supersonic speed, comprising the steps of:

providing said aerospace vehicle with a first spike extending from the nose thereof substantially in the direction of normal flight of said aerospace vehicle, said first spike having a second section aft of a first section that is aft of a leading end portion, said first and second sections having a second transition region therebetween and each of said sections having different cross-sectional areas, said leading end portion of said first spike tapering toward a predetermined cross-section with a first transition region between said predetermined cross-section and said first section; and configuring said first transition region so as to reduce the coalescence of shock waves produced by said first spike during normal supersonic flight of said aerospace vehicle.

33. The method of claim 32 wherein said leading end portion tapers toward a point.

34. The method of claim 32 wherein said leading end portion tapers toward an edge.

35. The method of claim 32 wherein said step of configuring said first transition region comprises locating said first transition region in a predetermined location relative to said fuselage.

36. The method of claim 32 wherein said step of configuring said first transition region comprises shaping said first transition region with a predetermined contour.

37. The method of claim 32 further comprising the step of providing said first spike with a second section having a second cross-sectional area different from said first cross-sectional area and a second transition region between said first section and said second section.

38. The method of claim 37 further comprising the step of providing said first spike with a third section having a third cross-sectional area different from said second cross-sectional area and a third transition region between said second section and said third section.

39. The method of claim 32 further comprising the step of providing said aerospace vehicle with a second spike extending from the rear thereof substantially opposite the direction of normal flight of said aerospace vehicle.

* * * * *